Dec. 15, 1942. M. WOHL 2,305,126
PROCESS OF MOLDING IMITATION TERRAZZA TILE
Filed Aug. 4, 1940

INVENTOR.
MAX WOHL.
Elmer L. Gwickel
ATTORNEY.

Patented Dec. 15, 1942

2,305,126

UNITED STATES PATENT OFFICE 2,305,126

PROCESS OF MOLDING IMITATION TERRAZZA TILE

Max Wohl, Hollywood, Fla.

Application August 4, 1940, Serial No. 351,332

5 Claims. (Cl. 18—61)

The invention relates to a process of producing an improved terrazza tile.

It is an object of the invention to produce inexpensively processed imitation terrazza tile.

Another object is to produce imitation terrazza tile having a surface layer of initially dry Portland cement impregnated with color pigment to simulate a natural slab of marble.

The foregoing and such other objects of the invention as will appear hereinafter as the description proceeds, will be more readily understood from a perusal of the following specification in which reference is made to the accompanying drawing, wherein.

Imitation or synthetic tile is commonly produced by applying color pigment directly upon the exposed surface or face of a moist cement or other plastic substance, which pigment penetrates the surface for a considerable depth so that if subsequently polished and smoothed, the intended ornamental effect is not distorted or obliterated. Another known method is to apply a decalcomania transfer to the moist surface and then apply sufficient pressure to effect a transfer of the color pigments to said surface. Various other means and processes well known to the art have been used with a limited degree of commercial success for various reasons.

The present process for making imitation terrazza tile produces a strong, durable, highly polished article without the customary requirement of hand polishing or burnishing the exterior surface or face. The manner of making will best be understood from the following detailed description of the various materials used and steps utilized.

Figure 1:
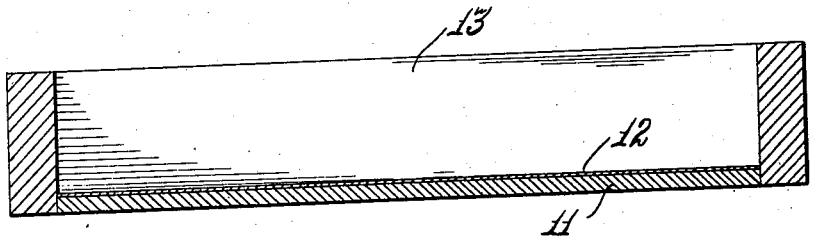
Fig. 1 is an enlarged fragmentary sectional view of a mold having a waxed bottom plate therein upon which the imitation tile is built.
Figure 2:
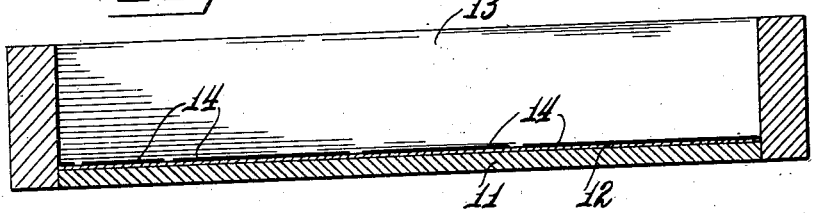
Fig. 2 is a view similar to Fig. 1, showing the waxed metal plate painted.
Figure 3:
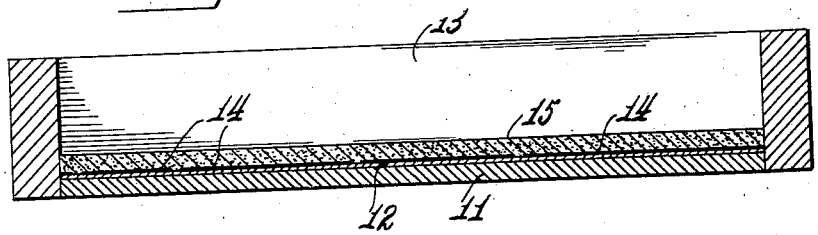
Fig. 3 is a view similar to Fig. 2 showing a layer of dry cement arranged over the painted metal plate.
Figure 4:
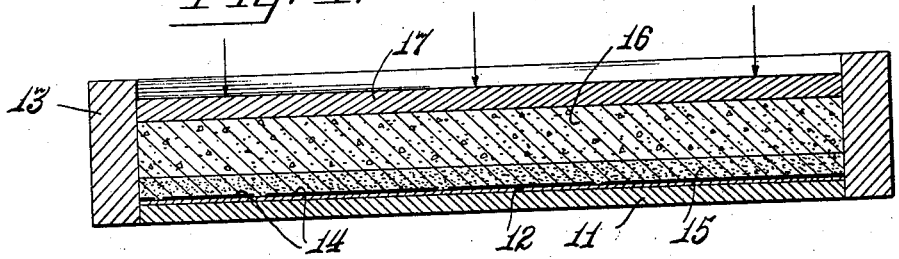
Fig. 4 is a sectional view similar to those previously described illustrating the application of pressure to partially finished imitation tile.
Figure 5:
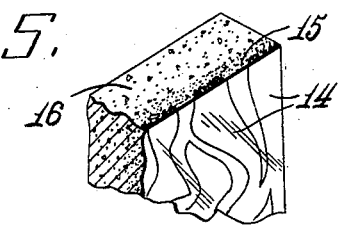
Fig. 5 is a perspective view of a fragment of the completed imitation terrazza tile.

As best illustrated in Fig. 1, a bottom mold plate 11, preferably of metal having at least one polished surface, is suitably coated with a layer of wax 12. The plate is then placed in a suitable mold which, for the purpose of this description, may consist of a shallow rectangular frame 13. Either before or after the plate is arranged in the frame 13, its upwardly disposed waxed surface is painted, spotted or grained with any desired arrangement of coloring 14 depending upon the particular ornamentation required. Dry Portland cement 15 is then poured into the mold and spread uniformly over the entire top surface, both painted and unpainted, of the plate 11, preferably to a depth not exceeding ¼ of an inch. A damp mix of cement and sand 16 then is poured or otherwise placed over the top of the layer of dry cement preferably to a thickness not exceeding one inch; the thickness, however, being determined entirely by the ultimate desired thickness of the finished product. It is preferred that the mix of cement and sand be substantially relieved of excessive moisture so as to avoid excessive hydration of the dry cement and minimize the time required for setting and drying.

A top plate 17 shaped to conform substantially to and fit easily within the mold 13 then is arranged over the top of the damp mix and the entire mold is placed in a suitable press, preferably a hydraulic power press, and subjected to considerable pressure for a brief period of time. The application of pressure tends to eliminate all air bubbles in the damp mix and force moisture therefrom into the layer of dry cement therebeneath thus hydrating said layer sufficiently to cause it to be concreted to the moist cement. The bottom layer of cement also is pressed tightly against the waxed mold plate; consequently, a smooth face results when the product is removed. The applied pressure is sufficient to cause the paint to impregnate the now hydrated thin layer of cement 15 to a depth sufficient to insure the retention of the intended ornamentation on the face of the finished product. An important characteristic of the instant process of manufacture is the preliminary arrangement of the dry cement over the paint. This insures attraction of the paint to the particles of cement prior to said cement becoming hydrated and consequently avoids blurring or distortion of the intended ornamentation.

When removed from the mold and dried, the product will have the hardness and smooth glazed exterior surface of natural tile and consequently polishing or burnishing is not essential unless an extremely high gloss is desired.

Although a preferred embodiment of the invention has been described herein in detail, it is to be understood that the description concerns itself with a highly efficient, inexpensive process for accomplishing the desired result, and it is not intended that the invention be limited thereby but only by such imitations as are embodied in the appended claims.

I claim:

1. The steps in the method of making synthetic terrazza tile which comprises painting a waxed surface, covering said painted surface with a thin layer of dry Portland cement, spreading a damp mix of sand and cement over said dry cement, and subjecting the whole to a substantial pressure to effect a concretion of the dry cement to said damp mixture and an impregnation of the surface of said dry cement with said paint.

2. The steps in the method of making synthetic terrazza tile which comprises selectively applying paint to a smooth waxed surface, covering said painted surface to a depth of approximately ¼ in. with dry Portland cement, spreading a damp mix of sand and cement over said dry cement, and subjecting the whole to a substantial pressure to effect a concretion of the dry cement to said damp mixture and an impregnation of the surface of said dry cement with said paint.

3. The steps in the method of making synthetic terrazza tile which comprises applying a coating of paint in a predetermined design to the waxed surface of a highly polished mold-plate, covering said paint layer to a depth of approximately ¼ in. with dry Portland cement, spreading a damp mix of sand and cement over said dry cement, and subjecting the whole to a substantial pressure to effect a hydration of the dry cement and impregnation of the surface of said dry cement with said paint.

4. The steps in the method of making synthetic terrazza tile which comprises painting a predetermined design on a waxed mold-surface, adding a layer of dry cement thereover, pouring a damp mixture of sand and cement over said dry layer and finally subjecting the whole to a substantial pressure to hydrate the dry layer and subsequently allowing the whole to dry.

5. The steps in the method of making synthetic terrazza tile, which comprises applying a quantity of wax to a highly polished mold surface, painting a predetermined design on said waxed surface, covering said painted surface with a thin layer of dry Portland cement, spreading a damp mix of sand and cement over said dry cement, and subjecting the whole to a substantial pressure to effect a concretion of the dry cement to said damp mixture and an impregnation of the surface of said dry cement with said paint.

MAX WOHL.